(12) United States Patent
Mizuno et al.

(10) Patent No.: US 11,333,409 B2
(45) Date of Patent: May 17, 2022

(54) CRYOCOOLER, CRYOCOOLER DIAGNOSIS DEVICE, AND CRYOCOOLER DIAGNOSIS METHOD

(71) Applicant: SUMITOMO HEAVY INDUSTRIES, LTD., Tokyo (JP)

(72) Inventors: Yoji Mizuno, Nishitokyo (JP); Kohei Shinohara, Nishitokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 42 days.

(21) Appl. No.: 16/794,199

(22) Filed: Feb. 18, 2020

(65) Prior Publication Data

US 2020/0263907 A1 Aug. 20, 2020

(30) Foreign Application Priority Data

Feb. 19, 2019 (JP) .............................. JP2019-027744

(51) Int. Cl.
*F25B 9/14* (2006.01)
*F25B 9/00* (2006.01)
*G01L 9/00* (2006.01)

(52) U.S. Cl.
CPC ................ *F25B 9/145* (2013.01); *F25B 9/00* (2013.01); *F25B 9/14* (2013.01); *F25B 2309/1411* (2013.01); *F25B 2309/1413* (2013.01); *F25B 2309/1414* (2013.01); *G01L 9/00* (2013.01); *G01L 9/0001* (2013.01)

(58) Field of Classification Search
CPC ..... F25B 9/00; F25B 9/14; G01L 9/00; G01L 9/0001
See application file for complete search history.

(56) References Cited

U.S. PATENT DOCUMENTS

| 5,009,072 A * | 4/1991 | Nagao ................... F02G 1/0445 60/520 |
| 7,357,037 B2 * | 4/2008 | Hnat ..................... A61B 5/0031 73/795 |
| 2005/0100414 A1 * | 5/2005 | Salama ................... E21B 17/01 405/224.2 |

FOREIGN PATENT DOCUMENTS

| EP | 0720006 A1 * | 7/1996 | ........... G01L 9/0001 |
| JP | H06-221703 A | 8/1994 | |
| JP | 2583721 B2 | 2/1997 | |
| JP | 2760928 B2 | 6/1998 | |

* cited by examiner

*Primary Examiner* — Lionel Nouketcha
(74) *Attorney, Agent, or Firm* — HEA Law PLLC

(57) ABSTRACT

There is provided a cryocooler including a cryocooler cylinder, a pressure switching valve that generates a periodic pressure fluctuation inside the cryocooler cylinder, and a sensor that measures a periodic deformation of the cryocooler cylinder, which is caused by the periodic pressure fluctuation inside the cryocooler cylinder.

9 Claims, 7 Drawing Sheets

CRYOCOOLER, CRYOCOOLER DIAGNOSIS DEVICE, AND CRYOCOOLER DIAGNOSIS METHOD

RELATED APPLICATIONS

The content of Japanese Patent Application No. 2019-027744, on the basis of which priority benefits are claimed in an accompanying application data sheet, is in its entirety incorporated herein by reference.

BACKGROUND

Technical Field

Certain embodiments of the present invention relate to a cryocooler, a cryocooler diagnosis device, and a cryocooler diagnosis method.

Description of Related Art

For example, a cryocooler such as a Gifford-McMahon (GM) cryocooler and a pulse tube cryocooler has been used in order to provide a cryogenic environment. For example, one of main uses of the cryocooler is a magnetic resonance imaging (MRI) system equipped with a superconducting coil. The superconducting coil is cooled by being immersed in a cryogenic refrigerant such as liquid helium, and the cryocooler is used in order to recondense a vaporized refrigerant. Alternatively, a method also has been used in which the superconducting coil is directly cooled by the cryocooler instead of using the refrigerant.

SUMMARY

According to an aspect of the present invention, there is provided a cryocooler including a cryocooler cylinder, a pressure switching valve that generates a periodic pressure fluctuation inside the cryocooler cylinder, and a sensor that measures a periodic deformation of the cryocooler cylinder, which is caused by the periodic pressure fluctuation inside the cryocooler cylinder.

According to another aspect of the present invention, there is provided a cryocooler diagnosis device including a sensor that measures a periodic deformation of a cryocooler cylinder of a cryocooler, which is caused by a periodic pressure fluctuation inside the cryocooler cylinder, or the periodic pressure fluctuation inside the cryocooler cylinder, and outputs measured waveform data indicating the periodic deformation or the periodic pressure fluctuation, and a processing unit that determines whether or not the cryocooler is degraded, based on the measured waveform data.

According to still another aspect of the present invention, there is provided a cryocooler diagnosis method including measuring a periodic deformation of a cryocooler cylinder of a cryocooler, which is caused by a periodic pressure fluctuation inside the cryocooler cylinder, or the periodic pressure fluctuation inside the cryocooler cylinder, acquiring measured waveform data indicating the periodic deformation or the periodic pressure fluctuation, and determining whether or not the cryocooler is degraded, based on the measured waveform data.

DETAILED DESCRIPTION

Figure 1:
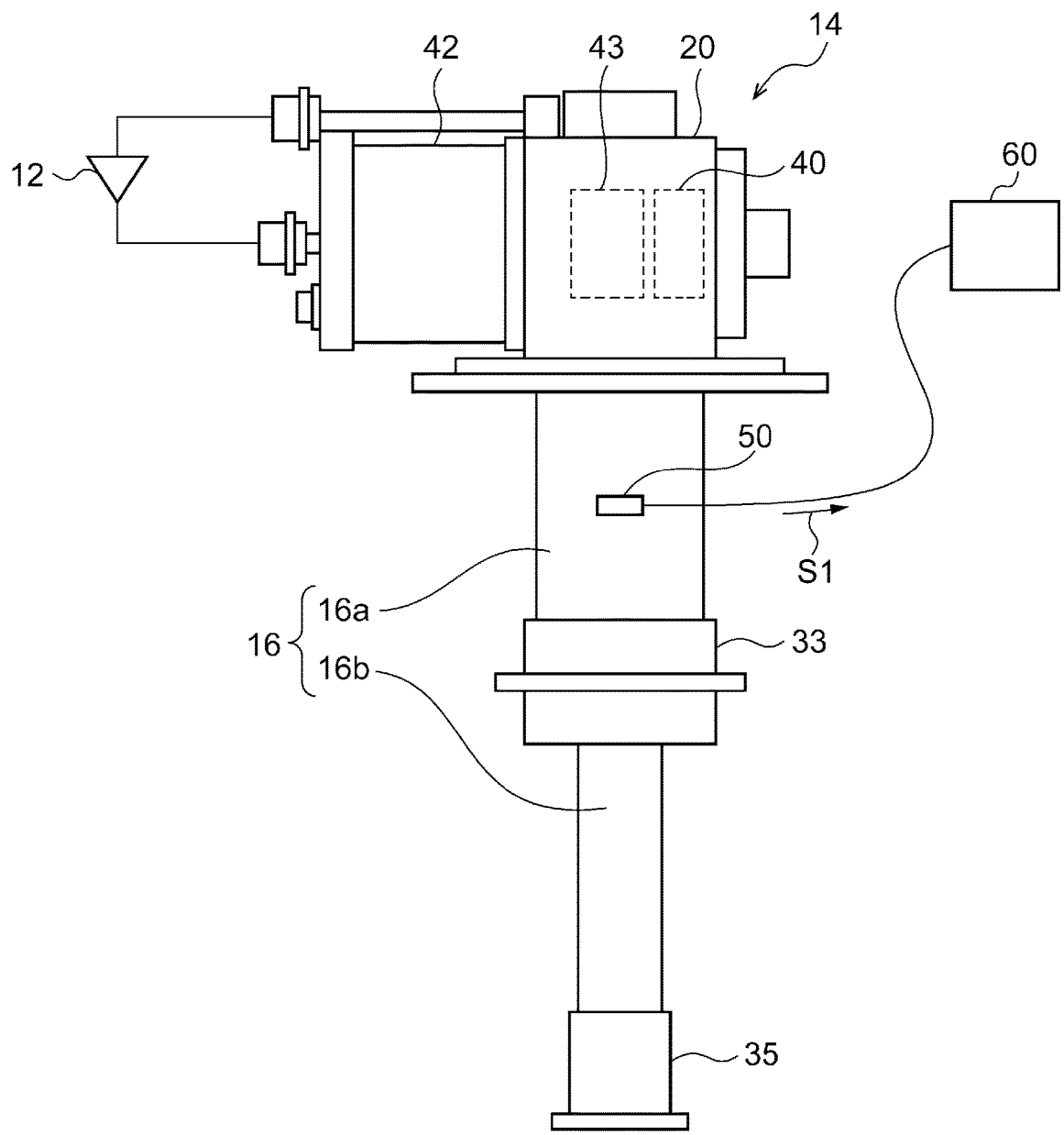
FIG. 1 is a view schematically illustrating a cryocooler according to an embodiment.

While a cryocooler is used, failures such as cooling performance degradation may occur due to abrasion of sliding components, a life of consumable components, and other reasons. An operation of cryogenic systems (for example, a superconducting device or an MRI system) has to be stopped until maintenance work such as repairing a failed cryocooler or replacing the failed cryocooler with a new one is completely carried out. In a case of a sudden failure, a time required for recovery tends to be relatively lengthened. However, if the failure can be systematically predicted and dealt with in advance, an effect on the operation of the system can be minimized.

There are attempts to predict the failure of the cryocooler by monitoring a cooling temperature of the cryocooler. The attempts are made based on a fact that the cryocooler is gradually less likely to be cooled as the cryocooler is used over a long term, and that the cooling temperature may rise little by little on along-term basis. However, the cooling temperature depends not only on a cumulative operating time, but also on an operating condition of the cryocooler, such as an input heat to a cryogenic unit. The cooling temperature is not always linearly changed in accordance with the cumulative operating time. Therefore, practically, a failure prediction function based on the cooling temperature is limitedly fulfilled.

It is desirable to provide a cryocooler capable of acquiring measurement data that can be used for a diagnosis of the cryocooler, and a cryocooler diagnosis technique based on the measurement data.

Any desired combination of the above-described components and those obtained by substituting the components or expressions according to the present invention with each other between methods, devices, and systems are also effective as an aspect of the present invention.

According to an aspect of the present invention, it is possible to provide a cryocooler capable of acquiring measurement data that can be used for a diagnosis of the cryocooler, and a diagnosis technique for the cryocooler based on the measurement data.

Hereinafter, an embodiment for embodying the present invention will be described in detail with reference to the drawings. In the description and the drawings, the same reference numerals will be assigned to the same or equivalent components, members, and processes, and repeated description will be omitted as appropriate. A scale or a shape of each element illustrated in the drawings is set for convenience in order to facilitate the description, and is not limitedly interpreted unless otherwise specified. The embodiment is a merely example, and does not limit the scope of the present invention. All features or combinations thereof described in the embodiment are not necessarily essential to the invention.

Figure 2:
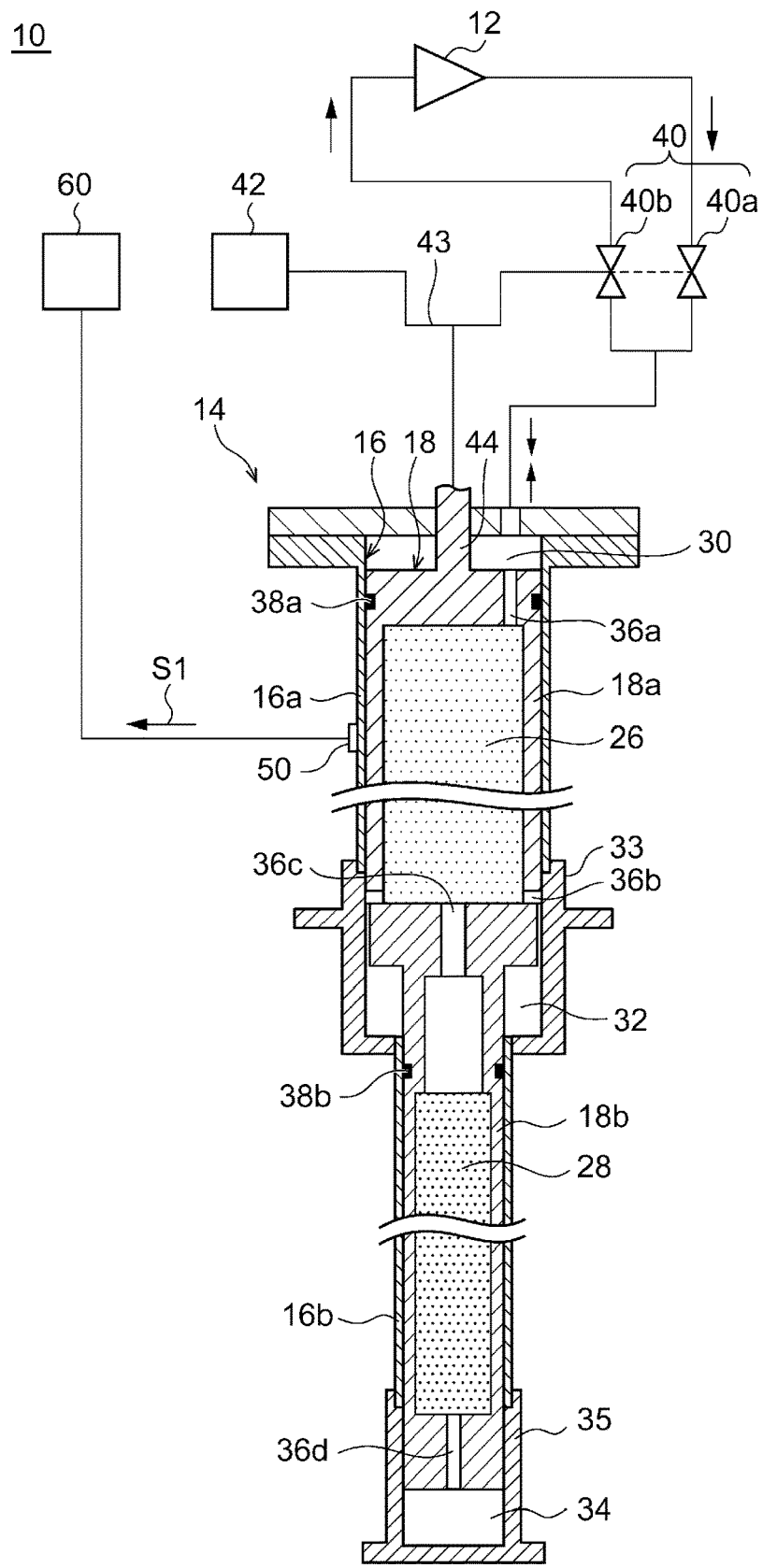
FIG. 2 is a view schematically illustrating the cryocooler according to the embodiment.

FIGS. 1 and 2 are views schematically illustrating a cryocooler 10 according to the embodiment. As an example, the cryocooler 10 is a two-stage type Gifford-McMahon (GM) cryocooler. FIG. 1 illustrates an outer configuration of the cryocooler 10, and FIG. 2 illustrates an internal structure of the cryocooler 10.

The cryocooler 10 includes a compressor 12 and an expander 14. The compressor 12 is configured to collect working gas of the cryocooler 10 from the expander 14, to pressurize the collected working gas, and to supply the working gas to the expander 14 again. The working gas is also called refrigerant gas, and is typically helium gas. However, other suitable gas may be used.

The expander 14 includes a cryocooler cylinder 16, a pressure switching valve 40, and a sensor 50. The cryocooler 10 includes a processing unit 60. Although details will be described later, a diagnosis device of the cryocooler 10 is configured to include the sensor 50 and the processing unit 60.

The cryocooler cylinder 16 has a first cylinder 16a and a second cylinder 16b. As an example, the first cylinder 16a and the second cylinder 16b are members having a cylindrical shape, and the second cylinder 16b has a smaller diameter than the first cylinder 16a. The first cylinder 16a and the second cylinder 16b are coaxially disposed, and a lower end of the first cylinder 16a is rigidly connected to an upper end of the second cylinder 16b.

The expander 14 includes a displacer assembly 18 having a first displacer 18a and a second displacer 18b. As an example, the first displacer 18a and the second displacer 18b are members having a cylindrical shape, and the second displacer 18b has a smaller diameter than the first displacer 18a. The first displacer 18a and the second displacer 18b are coaxially disposed.

The first displacer 18a is accommodated in the first cylinder 16a, the second displacer 18b is accommodated in the second cylinder 16b. The first displacer 18a can reciprocate in an axial direction along the first cylinder 16a, and the second displacer 18b can reciprocate in the axial direction along the second cylinder 16b. The first displacer 18a and the second displacer 18b are connected to each other, and both of these are integrally moved.

In the description herein, in order to conveniently describe a positional relationship between components of the cryocooler 10, a side close to a top dead center of axial reciprocation of the displacer will be referred to as "upward", and a side close to a bottom dead center will be referred to as "downward". The top dead center is a position of the displacer where a volume of an expansion space is maximized, and the bottom dead center is a position of the displacer where the volume of the expansion space is minimized. During an operation of the cryocooler 10, a temperature gradient occurs so that a temperature is lowered downward from above in an axial direction. Accordingly, the upper side can be called a high temperature side, and the lower side can be called a low temperature side.

The first displacer 18a accommodates a first regenerator 26. The first regenerator 26 is formed by filling a cylindrical main body of the first displacer 18a with a wire mesh such as copper or other suitable first regenerator materials, for example. An upper lid portion and a lower lid portion of the first displacer 18a may be provided as separate members from a main body of the first displacer 18a, and the upper lid portion and the lower lid portion of the first displacer 18a may be fixed to the main body by using suitable means such as fastening or welding. In this manner, the first regenerator material may be accommodated in the first displacer 18a.

Similarly, the second displacer 18b accommodates a second regenerator 28. The second regenerator 28 is formed by filling the cylindrical main body of the second displacer 18b with a nonmagnetic regenerator material such as bismuth, a magnetic regenerator material such as $HoCu_2$, or any other suitable second regenerator materials, for example. The second regenerator material may be formed in a granular shape. An upper lid portion and a lower lid portion of the second displacer 18b may be provided as separate members from a main body of the second displacer 18b, and the upper lid portion and the lower lid portion of the second displacer 18b may be fixed to the main body by using suitable means such as fastening or welding. In this manner, the second regenerator material may be accommodated in the second displacer 18b.

In the displacer assembly 18, a room temperature chamber 30, a first expansion chamber 32, and a second expansion chamber 34 are formed inside the cryocooler cylinder 16. In order to exchange heat with a desired object or a medium to be cooled by the cryocooler 10, the expander 14 includes a first cooling stage 33 and a second cooling stage 35. The room temperature chamber 30 is formed between the upper lid portion of the first displacer 18a and an upper portion of the first cylinder 16a. The first expansion chamber 32 is formed between the lower lid portion of the first displacer 18a and the first cooling stage 33. The second expansion chamber 34 is formed between the lower lid portion of the second displacer 18b and the second cooling stage 35. The first cooling stage 33 is fixed to the lower portion of the first cylinder 16a so as to surround the first expansion chamber 32, and the second cooling stage 35 is fixed to the lower portion of the second cylinder 16b so as to surround the second expansion chamber 34.

The first regenerator 26 is connected to the room temperature chamber 30 through a working gas flow path 36a formed in the upper lid portion of the first displacer 18a, and is connected to the first expansion chamber 32 through a working gas flow path 36b formed in the lower lid portion of the first displacer 18a. The second regenerator 28 is connected to the first regenerator 26 through a working gas flow path 36c formed from the lower lid portion of the first displacer 18a to the upper lid portion of the second displacer 18b. The second regenerator 28 is connected to the second expansion chamber 34 through a working gas flow path 36d formed in the lower lid portion of the second displacer 18b.

A first seal 38a and a second seal 38b may be provided so that a flow of the working gas among the first expansion chamber 32, the second expansion chamber 34, and the room temperature chamber 30 is guided to the first regenerator 26 and the second regenerator 28 without passing through a clearance between the cryocooler cylinder 16 and the displacer assembly 18. The first seal 38a may be mounted on the upper lid portion of the first displacer 18a so as to be disposed between the first displacer 18a and the first cylinder 16a. The second seal 38b may be mounted on the upper lid portion of the second displacer 18b so as to be disposed between the second displacer 18b and the second cylinder 16b.

As illustrated in FIG. 1, the expander 14 includes a cryocooler housing 20 that houses the pressure switching valve 40. The cryocooler housing 20 is combined with the cryocooler cylinder 16, thereby configuring a hermetic container that accommodates the pressure switching valve 40 and the displacer assembly 18.

As illustrated in FIG. 2, the pressure switching valve 40 includes a high-pressure valve 40a and a low-pressure valve 40b, and is configured to generate a periodic pressure fluctuation inside the cryocooler cylinder 16. A working gas discharge port of the compressor 12 is connected to the room temperature chamber 30 via the high-pressure valve 40a, and a working gas suction port of the compressor 12 is connected to the room temperature chamber 30 via the low-pressure valve 40b. The high-pressure valve 40a and the low-pressure valve 40b are configured to be selectively and alternately opened and closed (that is, so that the other is closed when one is opened). The working gas having high pressure (for example, 2 to 3 MPa) is supplied from the compressor 12 to the expander 14 through the high pressure valve 40a, and the working gas having low pressure (for example, 0.5 to 1.5 MPa) is collected from the expander 14 to the compressor 12 through the low-pressure valve 40b. In order to facilitate understanding, a flowing direction of the working gas is indicated by an arrow in FIG. 2.

The expander 14 has a drive motor 42 that drives the displacer assembly 18 to reciprocate. The drive motor 42 is attached to the cryocooler housing 20. The drive motor 42 is connected to a displacer drive shaft 44 via a motion conversion mechanism 43 such as a Scotch yoke mechanism, for example. As in the pressure switching valve 40, the motion conversion mechanism 43 is housed in the cryocooler housing 20. The displacer drive shaft 44 extends from the motion conversion mechanism 43 into the room temperature chamber 30, and is fixed to the upper lid portion of the first displacer 18a. When the drive motor 42 is driven, a rotation output of the drive motor 42 is converted to the axial reciprocation of the displacer drive shaft 44 by the motion conversion mechanism 43, and the displacer assembly 18 reciprocates inside the cryocooler cylinder 16 in the axial direction. The drive motor 42 is connected to the high-pressure valve 40a and the low-pressure valve 40b so as to selectively and alternately open and close the valves.

When the compressor 12 and the drive motor 42 are operated, the cryocooler 10 generates periodic volume fluctuations in the first expansion chamber 32 and the second expansion chamber 34 and pressure fluctuations of the working gas in synchronization with the volume fluctuations. In this manner, a refrigeration cycle is configured, thereby cooling the first cooling stage 33 and the second cooling stage 35 to a desired cryogenic temperature. The first cooling stage 33 can be cooled to a first cooling temperature in a range of approximately 20K to 40K, for example. The second cooling stage 35 can be cooled to a second cooling temperature lower than the first cooling temperature (for example, approximately 1K to 4K).

The sensor 50 measures a periodic deformation of the cryocooler cylinder 16, which is caused by a periodic pressure fluctuation in the cryocooler cylinder 16, and outputs measured waveform data S1 indicating the periodic deformation. The measured waveform data S1 indicates a temporal change in a measured value of the sensor 50 during an operation of the cryocooler 10. The sensor 50 is communicably connected to the processing unit 60 by wire or wirelessly. As an exemplary configuration, the sensor 50 is a contact-type displacement sensor. For example, the sensor 50 is attached to an outer surface on a side surface of the cryocooler cylinder 16, and measures the periodic deformation of the cryocooler cylinder 16 in the axial direction, the radial direction, and/or the circumferential direction.

The sensor 50 may be attached to an axial intermediate portion of the first cylinder 16a of the cryocooler cylinder 16, and measures the periodic deformation of the cryocooler cylinder 16 in the axial intermediate portion of the first cylinder 16a. For example, the sensor 50 measures a circumferential deformation of the first cylinder 16a. The sensor 50 may be a strain sensor. The strain sensor may measure a circumferential strain of the first cylinder 16a.

The measured waveform data S1 is input to the processing unit 60. The processing unit 60 is configured to receive the measured waveform data S1 from the sensor 50 and to determine whether or not the cryocooler 10 is degraded, based on the measured waveform data S1. As in the cryocooler housing 20 and the drive motor 42, the processing unit 60 is disposed in a room temperature part.

An internal configuration of the processing unit 60 is realized by elements or circuits such as a CPU and a memory of a computer as a hardware configuration, and is realized by a computer program as a software configuration. However, in the drawing, the internal configuration is appropriately illustrated as functional blocks realized in cooperation with each other. It is understood by those skilled in the art that the functional blocks can be realized in various forms by combining hardware and software with each other.

For example, the processing unit 60 can be installed by combining a processor (hardware) such as a central processing unit (CPU) and a microcomputer with a software program executed by the processor (hardware). The hardware processor may be configured to include a programmable logic device such as a field programmable gate array (FPGA), or may be a control circuit such as a programmable logic controller (PLC). The software program may be a computer program for causing the processing unit 60 to perform the diagnosis of the cryocooler 10.

Figure 3:
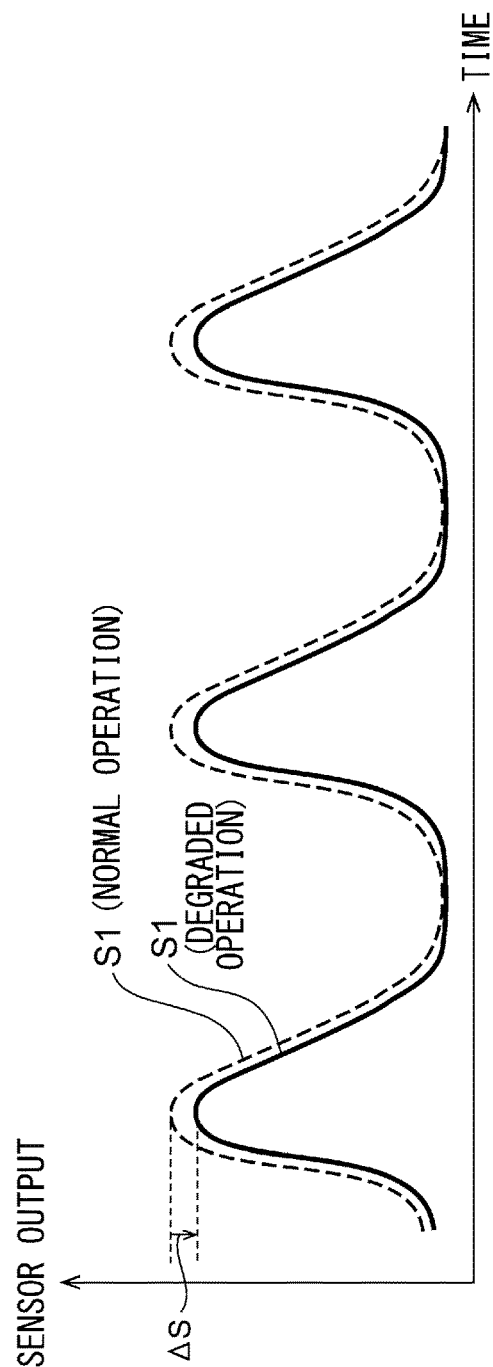
FIG. 3 is a view for describing a diagnosis principle of the cryocooler according to the embodiment.

FIG. 3 is a view for describing a diagnosis principle of the cryocooler 10 according to the embodiment. FIG. 3 illustrates an output of the sensor 50, that is, the measured waveform data S1. For example, the measured waveform data S1 indicates the circumferential strain of the first cylinder 16a of the cryocooler cylinder 16. The measured waveform data S1 illustrated by a broken line indicates a value measured when the cryocooler 10 is normally operated (for example, when a new cryocooler is installed at a jobsite). The measured waveform data S1 illustrated by a solid line indicates a value measured when the cryocooler 10 is operated for a long period of time and an internal seal component is degraded.

As described above, during an operation of the cryocooler 10, the internal pressure of the cryocooler cylinder 16 is alternately switched between high pressure and low pressure by the operation of the pressure switching valve 40. Typically, both the high pressure and the low pressure higher than ambient pressure (for example, atmospheric pressure). When the cryocooler cylinder 16 internally has the high pressure, the cryocooler cylinder 16 deforms to expand outward. When the cryocooler cylinder 16 internally has the low pressure, the cryocooler cylinder 16 also deforms to expand outward. However, a cylinder expansion amount at the high pressure is larger than a cylinder expansion amount at the low pressure. For example, an expansion magnitude of the cryocooler cylinder 16 is approximately 10 to 20 μm, as a change in the outer diameter of the cryocooler cylinder 16 (for example, in the axial intermediate portion).

Each time the internal pressure of the cryocooler cylinder 16 is the high pressure, the measured waveform data S1 shows a peak value. Each time the internal pressure of the cryocooler cylinder 16 is the low pressure, the measured waveform data S1 shows a valley value. It can be understood that the peak value decreases when the cryocooler 10 is degraded after being operated for a long period of time (solid line in FIG. 3), compared to when the cryocooler 10 is normally operated (broken line in FIG. 3). Whereas the peak value decreases, the valley value is not much changed.

When high-pressure working gas is supplied into the cryocooler cylinder 16, for example, if some of the working gas leaks to the cryocooler housing 20 from the cryocooler cylinder 16, a pressure peak decreases inside the cryocooler cylinder 16. As a result, the peak value of the measured waveform data S1 also decreases. The peak value may decrease due to the increasing pressure loss caused by accumulated abrasion powder in the working gas flow path of the regenerator. In this way, internal leakage increases due to abrasion or aging of internal components of the expander 14. For this reason, it is considered that the peak value decreases.

A reduced amount ΔS of the peak value increases as a cumulative operating time of the cryocooler 10 is lengthened. An increase in the reduced amount ΔS (that is, an increase in the internal leakage) causes refrigeration performance degradation of the cryocooler 10. Therefore, whether or not the cryocooler 10 is degraded can be determined based on the reduced amount ΔS of the peak value.

Figure 4:
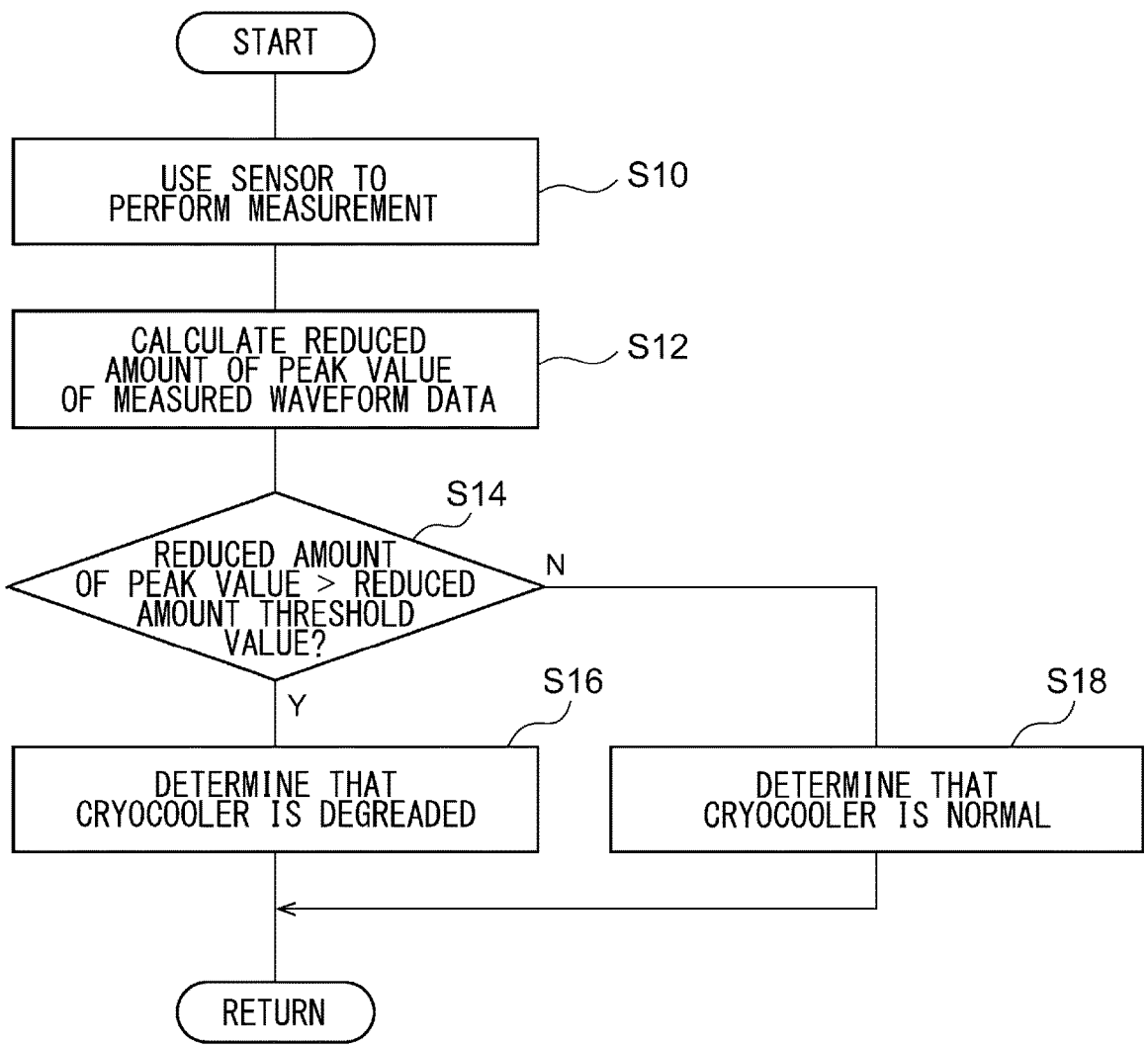
FIG. 4 is a flowchart illustrating a diagnosis method for the cryocooler according to the embodiment.

FIG. 4 is a flowchart illustrating a diagnosis method for the cryocooler 10 according to the embodiment. First, measurement is performed by the sensor 50 (S10). The sensor 50 acquires the measured waveform data S1, and outputs the measured waveform data S1 to the processing unit 60. As described above, in a case where the sensor 50 is the strain sensor, the measured waveform data S1 indicates a strain (for example, a circumferential strain) of the cryocooler cylinder 16 which is caused by the periodic pressure fluctuation inside the cryocooler cylinder 16. In a case where the sensor 50 is the pressure sensor, the measured waveform data S1 indicates a periodic pressure fluctuation inside the cryocooler cylinder 16.

The reduced amount ΔS of the peak value of the measured waveform data S1 is calculated (S12). The processing unit 60 calculates a difference between a reference peak value and the peak value of the measured waveform data S1. In this manner, the reduced amount ΔS of the peak value is obtained.

The reference peak value is preset and stored in the processing unit 60. The reference peak value may be the peak value of the measured waveform data S1 which is measured when the cryocooler 10 is normally operated. The reference peak value can be set as appropriate, based on a designer's empirical knowledge or a designer's experiment and simulation.

The calculated reduced amount ΔS of the peak value of the measured waveform data S1 is compared with a reduced amount threshold value (S14). The reduced amount threshold value is preset and stored in the processing unit 60. The reduced amount threshold value can be set as appropriate, based on a designer's empirical knowledge or a designer's experiment and simulation.

The processing unit 60 compares the calculated reduced amount ΔS with the reduced amount threshold value, and in a case where the reduced amount ΔS is larger than the reduced amount threshold value (Y in S14), the processing unit 60 determines that the cryocooler 10 is degraded (S16). In a case where the reduced amount ΔS is smaller than the reduced amount threshold value (N in S14), the processing unit 60 determines that the cryocooler 10 is normal (S18). The processing unit 60 stores a determination result, and outputs the determination result, if necessary.

The processing unit 60 periodically performs the diagnosis process.

As described above, according to the embodiment, the cryocooler 10 includes the sensor 50 that measures the periodic deformation of the cryocooler cylinder 16 which is caused by the periodic pressure fluctuation inside the cryocooler cylinder 16. Therefore, the cryocooler 10 can acquire the measured waveform data S1. The measured waveform data S1 can be used for the diagnosis of the cryocooler 10.

The sensor 50 measures the periodic deformation of the cryocooler cylinder 16 in the axial intermediate portion of the cryocooler cylinder 16. The periodic deformation of the cryocooler cylinder 16 further increases in the axial intermediate portion than in the axial end portion. Accordingly, the measured waveform data S1 can be more accurately acquired by measuring the deformation in the axial intermediate portion.

The sensor 50 measures the circumferential strain of the cryocooler cylinder. The circumferential strain is greater than the strain in other directions (for example, the axial direction or the radial direction). Accordingly, the measured waveform data S1 can be more accurately acquired by measuring the circumferential strain.

The processing unit 60 determines whether or not the cryocooler 10 is degraded, based on the measured waveform data S1. In this way, the cryocooler 10 can be more accurately diagnosed, compared to the diagnosis based on the cooling temperature.

In a case where the cryocooler suddenly fails, a time required for recovery tends to be relatively lengthened. For example, if a repair service for the cryocooler is busy, a user may wait several or more days for repair completion. There is a possibility that the user may not operate the system as planned. In a system where a cryogenic refrigerant such as liquid helium is used for cooling, the refrigerant cannot be recondensed while the cryocooler is stopped. As the stopped period of the cryocooler is lengthened, the amount of the evaporated and lost refrigerant increases, and a large amount of the refrigerant may need to be replenished. In particular, in a case where the refrigerant is the liquid helium, since the liquid helium is expensive in recent years, the user's economic burden increases.

However, according to the embodiment, the degradation of the cryocooler 10 is detected. Accordingly, the user of the cryocooler 10 or the system equipped with the cryocooler 10 (for example, an MRI system) can plan maintenance work such as repairing work or replacing work for a new component. The maintenance work can be set at a convenient timing. In this manner, influence on the system operation can be minimized. The refrigerant loss caused by the evaporation is reduced, and cost for the system operation can be reduced.

The processing unit 60 calculates the reduced amount ΔS of the peak value of the measured waveform data S1 from the preset reference peak value, and determines whether or not the cryocooler 10 is degraded, based on the reduced amount ΔS. The cryocooler 10 can be more accurately diagnosed, compared to a case where the determination is made based on a reduced amount of a value other than the peak value (for example, a valley value).

Other configurations can be adopted for the disposition or the type of the sensor 50 in the cryocooler 10 and the diagnosis device according to the embodiment. The examples will be described below with reference to FIGS. 5 to 7.

Figure 5:
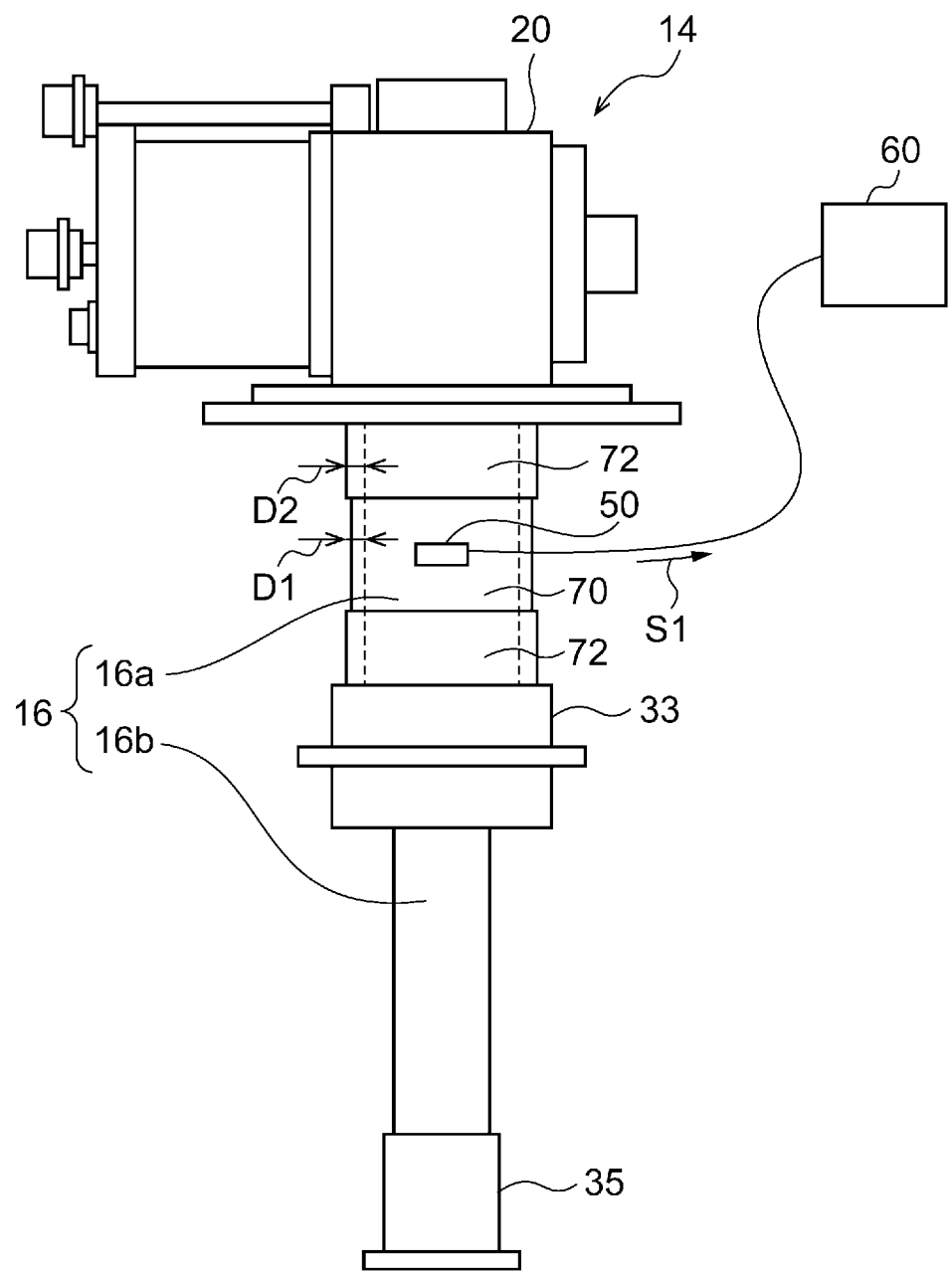
FIG. 5 is a view schematically illustrating the cryocooler according to the embodiment.

As illustrated in FIG. 5, the sensor 50 is attached to the axial intermediate portion 70 of the first cylinder 16a of the cryocooler cylinder 16, thereby measuring the periodic deformation of the first cylinder 16a in the axial intermediate portion 70 of the first cylinder 16a.

The axial intermediate portion 70 of the first cylinder 16a is thinner than the axial end portion 72 of the first cylinder 16a. A thickness D1 of the axial intermediate portion 70 of the first cylinder 16a is thinner than a thickness D2 of the axial end portion 72 of the first cylinder 16a. An inner diameter of the first cylinder 16a is set to be constant in the axial direction. Accordingly, the axial intermediate portion 70 of the first cylinder 16a is recessed compared to the axial end portion 72 when viewed from the outside.

In this case, the periodic deformation of the cryocooler cylinder 16 further increases in the axial intermediate portion 70 than in the axial end portion 72. Accordingly, the measured waveform data S1 can be more accurately acquired by measuring the deformation in the axial intermediate portion 70. The processing unit 60 can more accurately diagnose the cryocooler 10.

The thickness of the axial intermediate portion 70 of the first cylinder 16a is thinner than the thickness of the axial end portion 72. This fact is advantageous in that it is possible to reduce an input heat from a room temperature part such as the cryocooler housing 20 to a low-temperature section such as the first cooling stage 33 through the first cylinder 16a.

Figure 6:
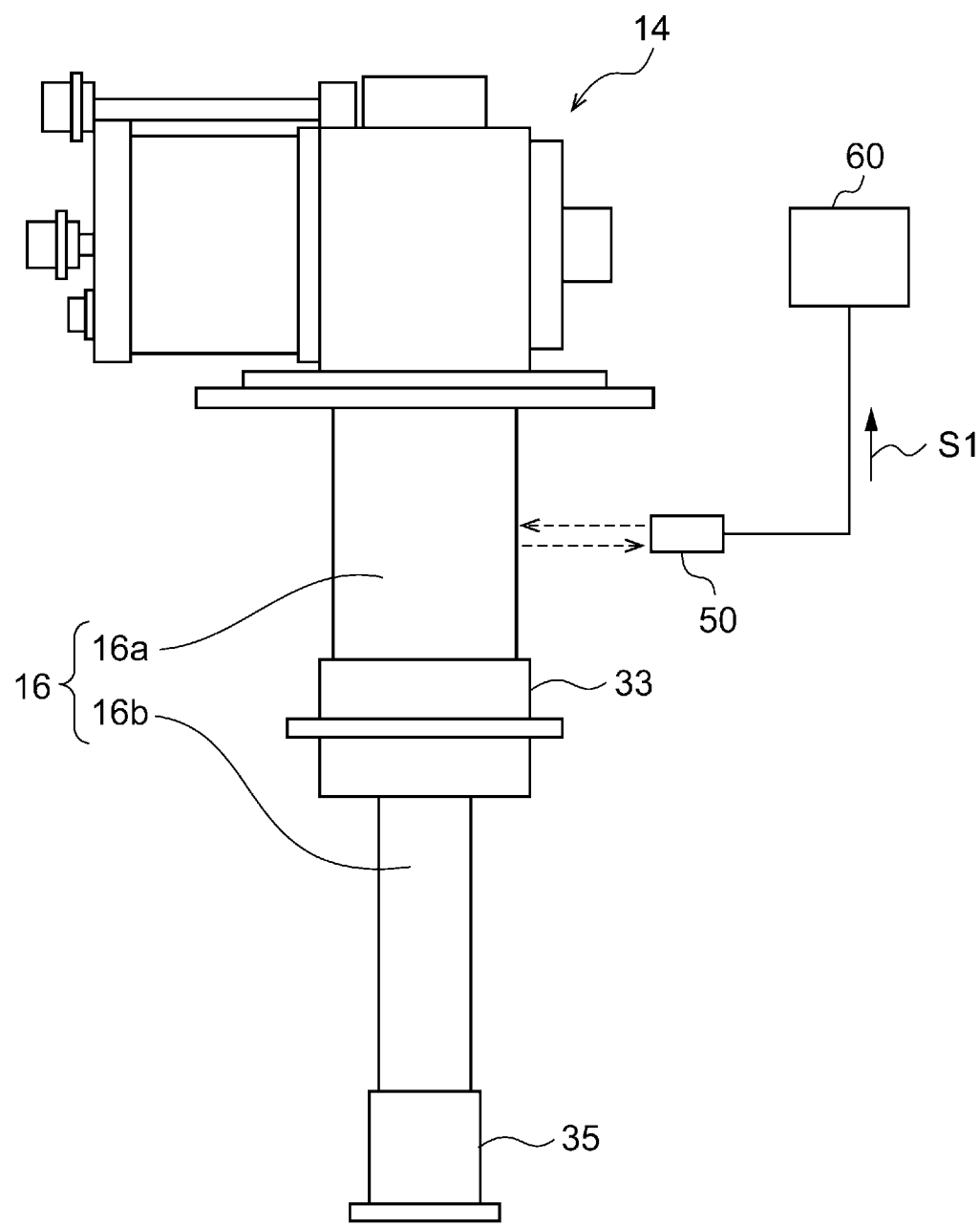
FIG. 6 is a view schematically illustrating the cryocooler according to the embodiment.

As illustrated in FIG. 6, the sensor 50 may be a non-contact type sensor such as a laser displacement meter. In a case of the laser displacement meter, a radial deformation amount of the cryocooler cylinder 16 is measured. The sensor 50 is disposed around the cryocooler cylinder 16, and measures the periodic deformation of the cryocooler cylinder 16. For example, the sensor 50 measures the periodic deformation of the first cylinder 16a in the axial intermediate portion of the first cylinder 16a. Even in this case, the measured waveform data S1 can be acquired and used for the diagnosis of the cryocooler 10.

Figure 7:
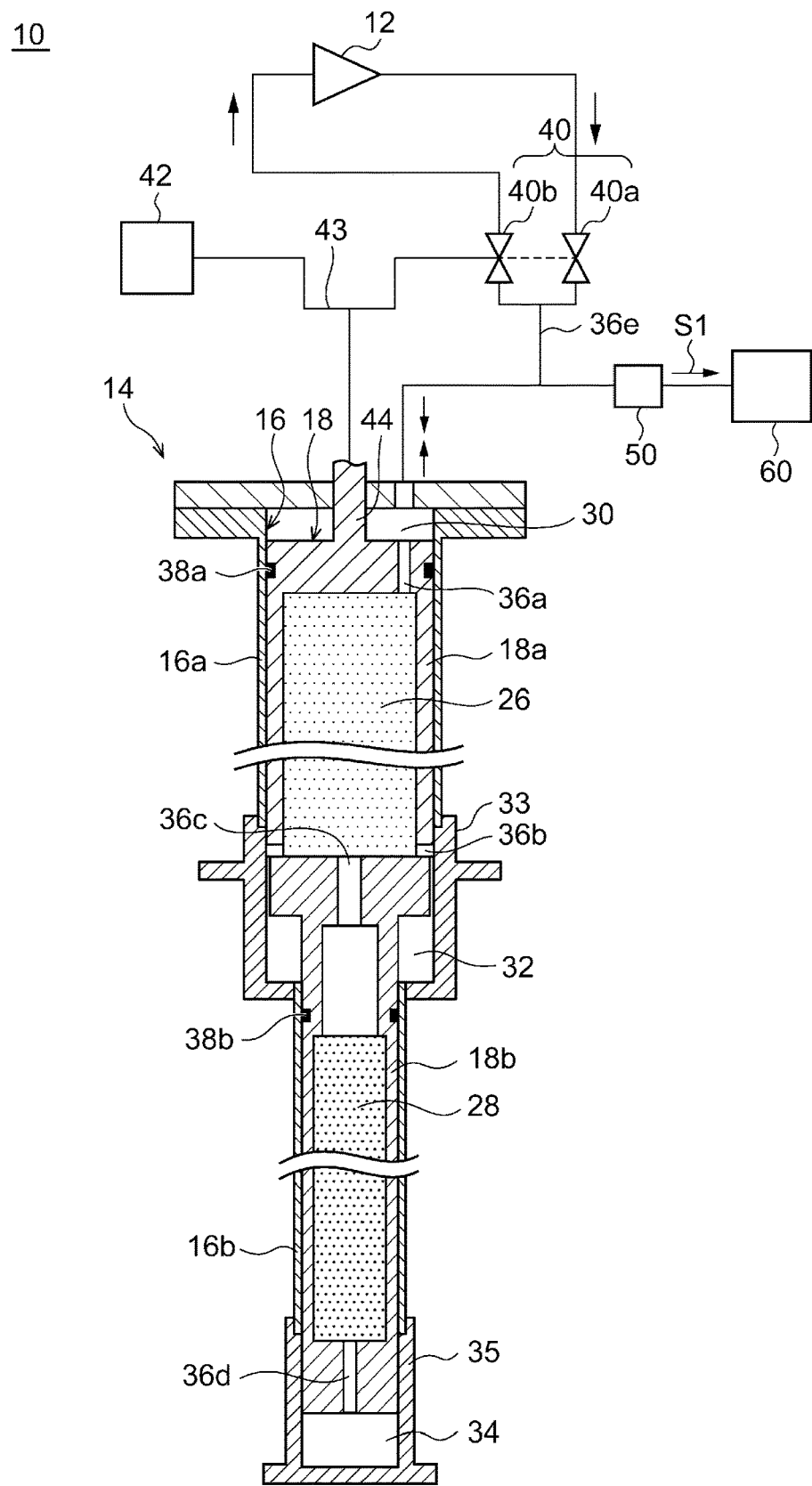
FIG. 7 is a view schematically illustrating the cryocooler according to the embodiment.

As illustrated in FIG. 7, the sensor 50 may be a pressure sensor that measures the periodic pressure fluctuation inside the cryocooler cylinder 16 and outputs the measured waveform data S1 indicating the periodic pressure fluctuation. For example, the sensor 50 is installed in the working gas flow path 36e that connects the pressure switching valve 40 and the room temperature chamber 30 to each other. The sensor 50 may be installed in the room temperature chamber 30. Alternatively, the sensor 50 may be installed in the first expansion chamber 32 or the second expansion chamber 34. Even in this case, the measured waveform data S1 can be acquired and used for the diagnosis of the cryocooler 10.

Hitherto, the present invention has been described with reference to the examples. The present invention is not limited to the above-described embodiments, and design can be changed in various ways. It will be understood by those skilled in the art that various modification examples can be adopted and the modification examples also fall within the scope of the present invention. Various features described with regard to one embodiment are applicable to other embodiments. A new embodiment adopted in combination with the above-described embodiment has each advantageous effect of the combined embodiments.

In a certain embodiment, the sensor 50 may measure the periodic deformation of the second cylinder 16b of the cryocooler cylinder 16. The sensor 50 may be attached to the axial intermediate portion of the second cylinder 16b, and may measure the periodic deformation of the cryocooler cylinder 16 in the axial intermediate portion of the second cylinder 16b. The axial intermediate portion of the second cylinder 16b may be thinner than the axial end portion of the second cylinder 16b. However, the second cylinder 16b is cooled to be lower than the first cylinder 16a, and the second cylinder 16b is typically thicker than the first cylinder 16a.

Accordingly, the sensor 50 is easily attached to the first cylinder 16a. Therefore, it is advantageous to mount the sensor 50 in this way.

In a certain embodiment, instead of forming a part of the cryocooler 10, the processing unit 60 may be a part of a system equipped with the cryocooler 10 (for example, a superconducting device or an MRI system).

The cryocooler 10 may be a single-stage GM cryocooler.

In the above-described embodiments, the GM cryocooler has been described as an example. However, the present invention is not limited thereto. In a certain embodiment, the cryocooler 10 may be a pulse tube cryocooler, for example, a GM-type pulse tube cryocooler. In this case, the above-described "cryocooler cylinder" may be a pulse tube of the pulse tube cryocooler. The cryocooler 10 may include a pressure switching valve that generates the periodic pressure fluctuation inside the pulse tube, and the sensor 50 that measures the periodic deformation of the pulse tube which is caused by the periodic pressure fluctuation inside the pulse tube. Alternatively, the "the cryocooler cylinder" may be a regenerator tube of the pulse tube cryocooler. The sensor 50 may be attached to the pulse tube or the regenerator tube.

The present invention has been described using specific terms and phrases with reference to the embodiment. However, the embodiment merely shows one aspect of the principle and application of the present invention. Many modification examples and disposition changes may be made within the scope not departing from the concept of the invention disclosed in the appended claims.

It should be understood that the invention is not limited to the above-described embodiment, but may be modified into various forms on the basis of the spirit of the invention. Additionally, the modifications are included in the scope of the invention.

What is claimed is:

1. A cryocooler comprising:
    a cryocooler cylinder;
    a pressure switching valve that generates a periodic pressure fluctuation inside the cryocooler cylinder;
    a sensor that measures a periodic deformation of the cryocooler cylinder caused by the periodic pressure fluctuation inside the cryocooler cylinder, or measures the periodic pressure fluctuation inside the cryocooler cylinder; and
    a processor communicably connected to the sensor and configured to:
        receive measured waveform data indicating the periodic deformation or the periodic pressure fluctuation from the sensor, and to
        determine whether or not the cryocooler is degraded based on the measured waveform data, and
    wherein the processor is further configured to:
        calculate a reduced amount of a peak value of the measured waveform data from a preset reference peak value,
        compare the reduced amount of the peak value with a reduced amount threshold value, and
        determine that the cryocooler is degraded if the reduced amount of the peak value is greater than the reduced amount threshold value.

2. The cryocooler according to claim 1,
    wherein the sensor measures the periodic deformation of the cryocooler cylinder in an axial intermediate portion of the cryocooler cylinder.

3. The cryocooler according to claim 2,
wherein the axial intermediate portion of the cryocooler cylinder is thinner than an axial end portion of the cryocooler cylinder.

4. The cryocooler according to claim 2,
wherein the sensor is attached to an outer surface on a side surface of the cryocooler cylinder.

5. The cryocooler according to claim 1,
wherein the sensor measures a circumferential strain of the cryocooler cylinder.

6. The cryocooler according to claim 1,
wherein the cryocooler cylinder has
a first cylinder,
a second cylinder disposed coaxially with the first cylinder and having a smaller diameter than the first cylinder, and
wherein the sensor is attached to the first cylinder.

7. The cryocooler according to claim 1, further comprising:
a displacer assembly that internally accommodates a regenerator material, and that is accommodated to be reciprocable inside the cryocooler cylinder; and
a cooling stage fixed to the cryocooler cylinder,
wherein the displacer assembly forms an expansion chamber inside the cryocooler cylinder, and the cooling stage is disposed to surround the expansion chamber.

8. A cryocooler diagnosis device comprising:
a sensor that measures a periodic deformation of a cryocooler cylinder of a cryocooler, wherein the periodic deformation is caused by a periodic pressure fluctuation inside the cryocooler cylinder, or measures a periodic pressure fluctuation inside a cryocooler cylinder of a cryocooler; and
a processor communicably connected to the sensor and configured to:
receive measured waveform data indicating the periodic deformation or the periodic pressure fluctuation from the sensor, and to
determine whether or not the cryocooler is degraded based on the measured waveform data,
wherein the processor is further configured to calculate a reduced amount of a peak value of the measured waveform data from a preset reference peak value, compare the reduced amount of the peak value with a reduced amount threshold value, and determine that the cryocooler is degraded if the reduced amount of the peak value is greater than the reduced amount threshold value.

9. A cryocooler diagnosis method comprising:
measuring a periodic deformation of a cryocooler cylinder of a cryocooler, wherein the periodic deformation is caused by a periodic pressure fluctuation inside the cryocooler cylinder, or measuring a periodic pressure fluctuation inside a cryocooler cylinder of a cryocooler,
acquiring measured waveform data indicating the periodic deformation or the periodic pressure fluctuation; and
determining whether or not the cryocooler is degraded based on the measured waveform data,
wherein the determining comprises calculating a reduced amount of a peak value of the measured waveform data from a preset reference peak value, comparing the reduced amount of the peak value with a reduced amount threshold value, and determining that the cryocooler is degraded if the reduced amount of the peak value is greater than the reduced amount threshold value.

* * * * *